United States Patent Office 3,609,844
Patented Oct. 5, 1971

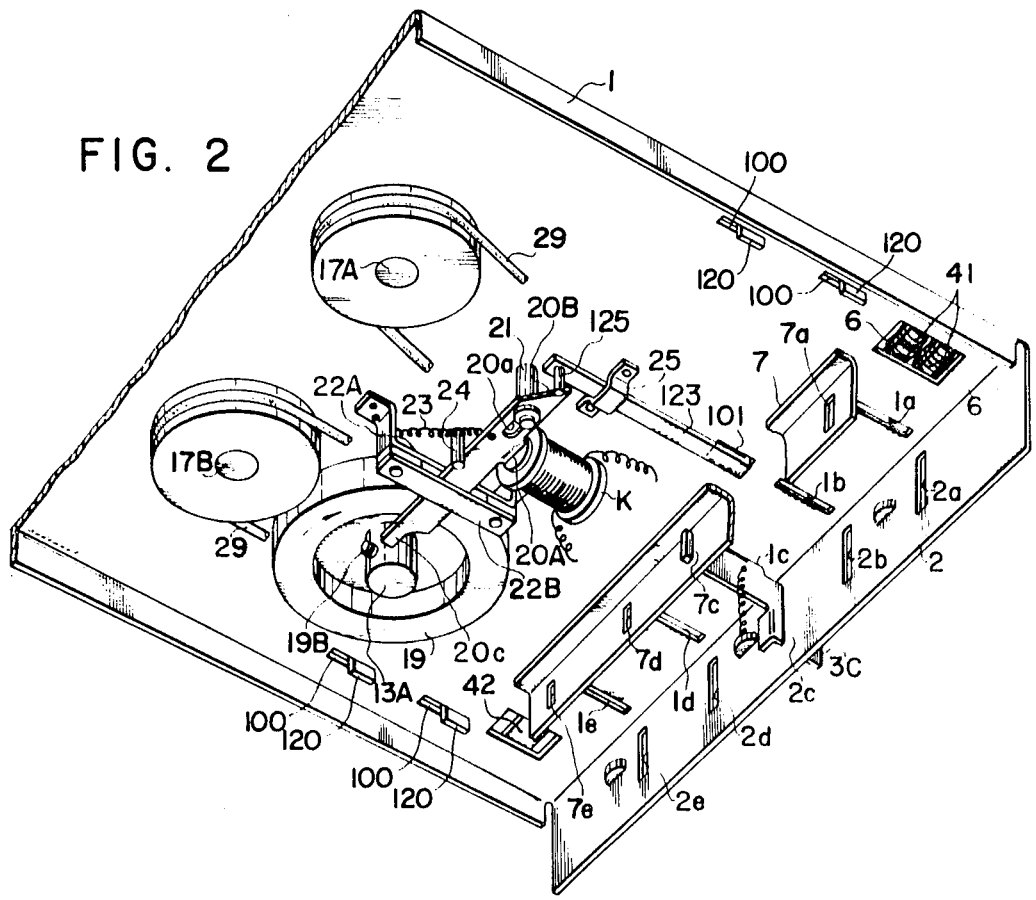
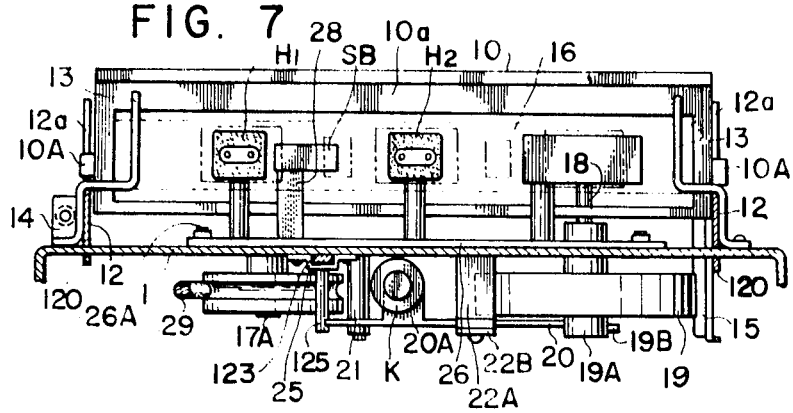

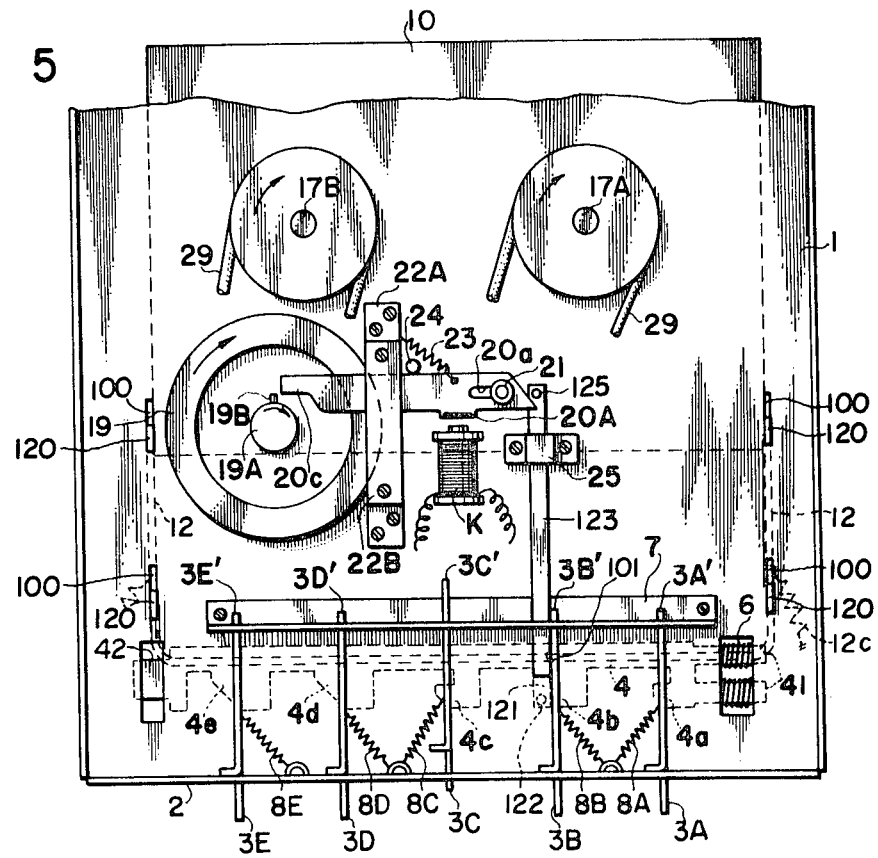
FIG. 5
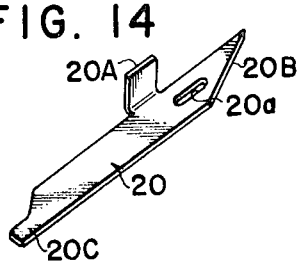
FIG. 13
FIG. 14

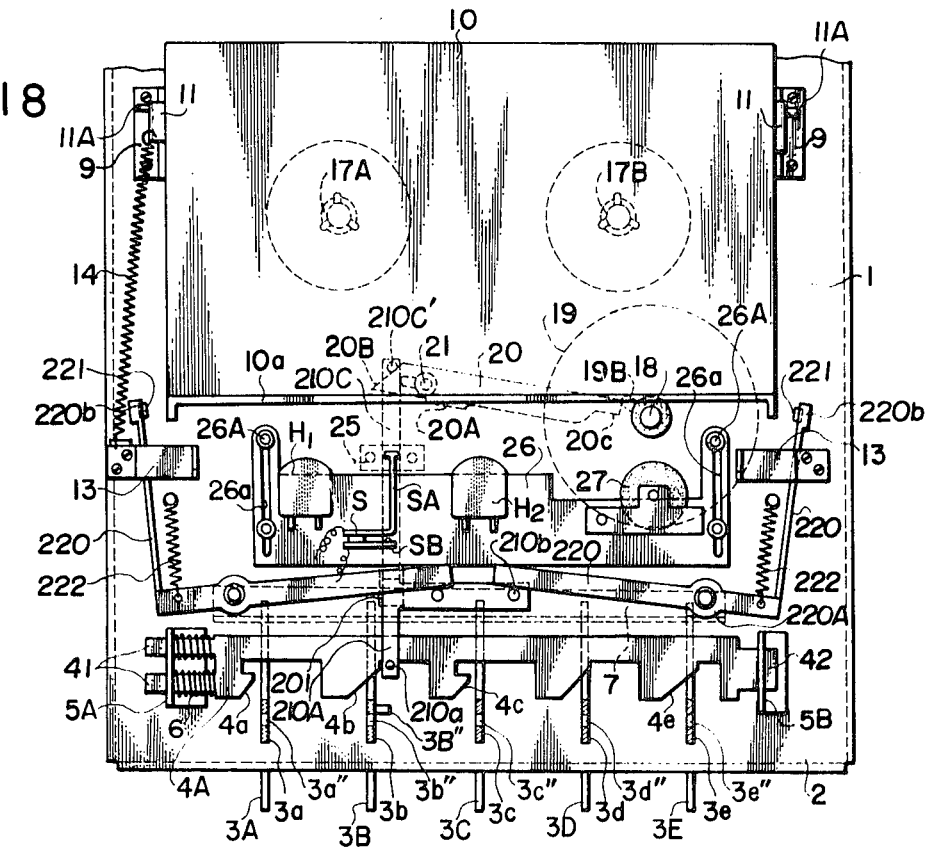
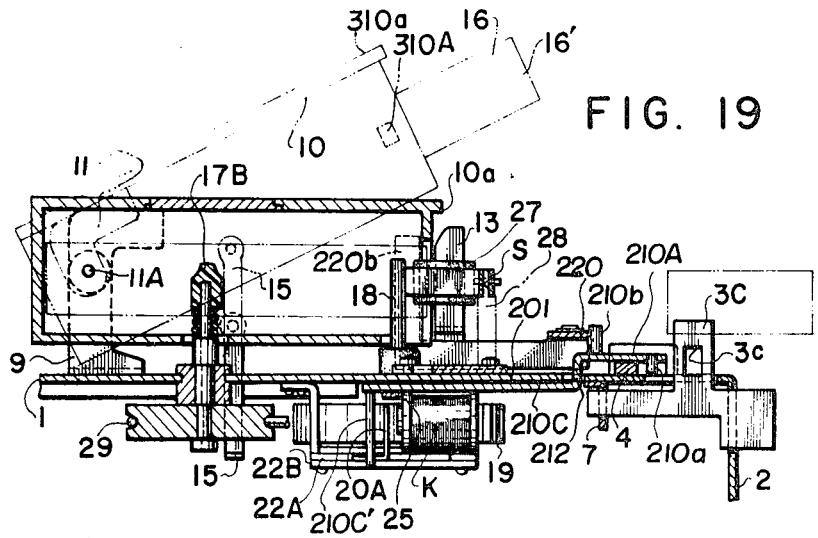

1

3,609,844
AUTOMATIC MEANS FOR ERECTING A
CASSETTE BOX
Yoshikazu Ichikawa, Tokyo, Japan, assignor to
Aiwa Co., Ltd., Tokyo, Japan
Filed Apr. 3, 1969, Ser. No. 813,179
Claims priority, application Japan, Apr. 8, 1968,
43/23,238, 43/23,239
Int. Cl. B23p 19/00
U.S. Cl. 29—200 R                          8 Claims

ABSTRACT OF THE DISCLOSURE

An improved means for automatically erecting a cassette box for receiving a magnetic tape cassette of a magazine type magnetic recording and playing apparatus or a film cassette of a photographic camera, in which means there is provided a mechanism for automatically erecting the cassette box when the carrier such as a tape is substantially completely recorded or played.

BACKGROUND OF THE INVENTION

Field of the invention

The present invention relates to a means for automatically erecting a cassette box, and more particularly to an improvement in a means for erecting a cassette box for housing a magnetic tape cassette of a magazine type magnetic recorder or a film cassette of a photographic camera.

SUMMARY OF THE INVENTION

It is an object of the present invention to provide a means for erecting a cassette box, said means comprising a cassette box for housing a magnetic tape or the like erectably and pivotally mounted at its rear portion on a base plate of an instrument in which the cassette box is used, the front portion of the cassette box being spring biased so that it projects through an opening in a housing upper plate, the arrangement being such that the cassette can be locked in a position in which it lies in a plane parallel to the base plate against the action of the resilient force of the spring by engaging a recess or a projection provided on the front portion thereof with a rotatable or a slidable locking arm of a separately provided push-button type switching device, whereby for example a tape core of a magnetic tape cassette housed in the cassette box is engaged with a rotatable shaft rotatably mounted on the base so that the magnetic tape can be driven at a normal forward feed speed, a fast forward feed speed and a rewinding speed, an electric solenoid being instantaneously energized through a switch when the running tape approaches its end so as to operate a swingable piece for restoring the switching device and the locking arm to move the tip end of the piece toward a projection provided on a rotatable member such as a flywheel of the instrument, the rotation of the projection being utilized to move the swingable piece to initially restore the switching device to the initial position to keep it in a stopped condition, then slidingly move the rotatable or slidable locking arm to release its engageable portion from the engageable portion of the cassette box, whereby the front portion of the cassette box is automatically projected upwardly under the resilient force of the spring so as to facilitate the replacing operation of a cassette for such as a magnetic tape.

2

BRIEF DESCRIPTION OF THE DRAWINGS

FIG. 2 is a perspective view of the lower portion of the device shown in FIG. 1.

FIG. 5 is a bottom view of the device corresponding to FIG. 3.

FIG. 7 is a sectional view taken along the line VII—VII of FIG. 3.

FIG. 13 is a perspective view of a pushing piece which is a further component of the said device.

FIG. 14 is a perspective view of a swingable rod which is another component of the said device.

FIG. 18 is a plan view of the said device similar to FIG. 17 but showing another position of operation.

FIG. 19 is a sectional view taken along the line XIX—XIX of FIG. 17.

In the following descriptions, corresponding parts are designated by identical reference numerals.

DESCRIPTION OF THE PREFERRED EMBODIMENTS

An embodiment of the present invention will now be described with reference to FIGS. 1 through 15.

The metallic base plate 1 of a magnetic recorder is downwardy bent at the forward edge at a right angle, as shown in FIG. 2, to form an upright piece 2. The base plate 1 is further provided at its forward portion adjacent to the upright piece with elongated guide slots 2a, 2b, . . . 2e; and 1a, 1b, . . . 1e which are spaced from and parallel with each other. Within each of these guide slots, there is loosely inserted a pushing piece 3A, 3B, . . . 3E of substantially shaped cross section.

Figure 1:
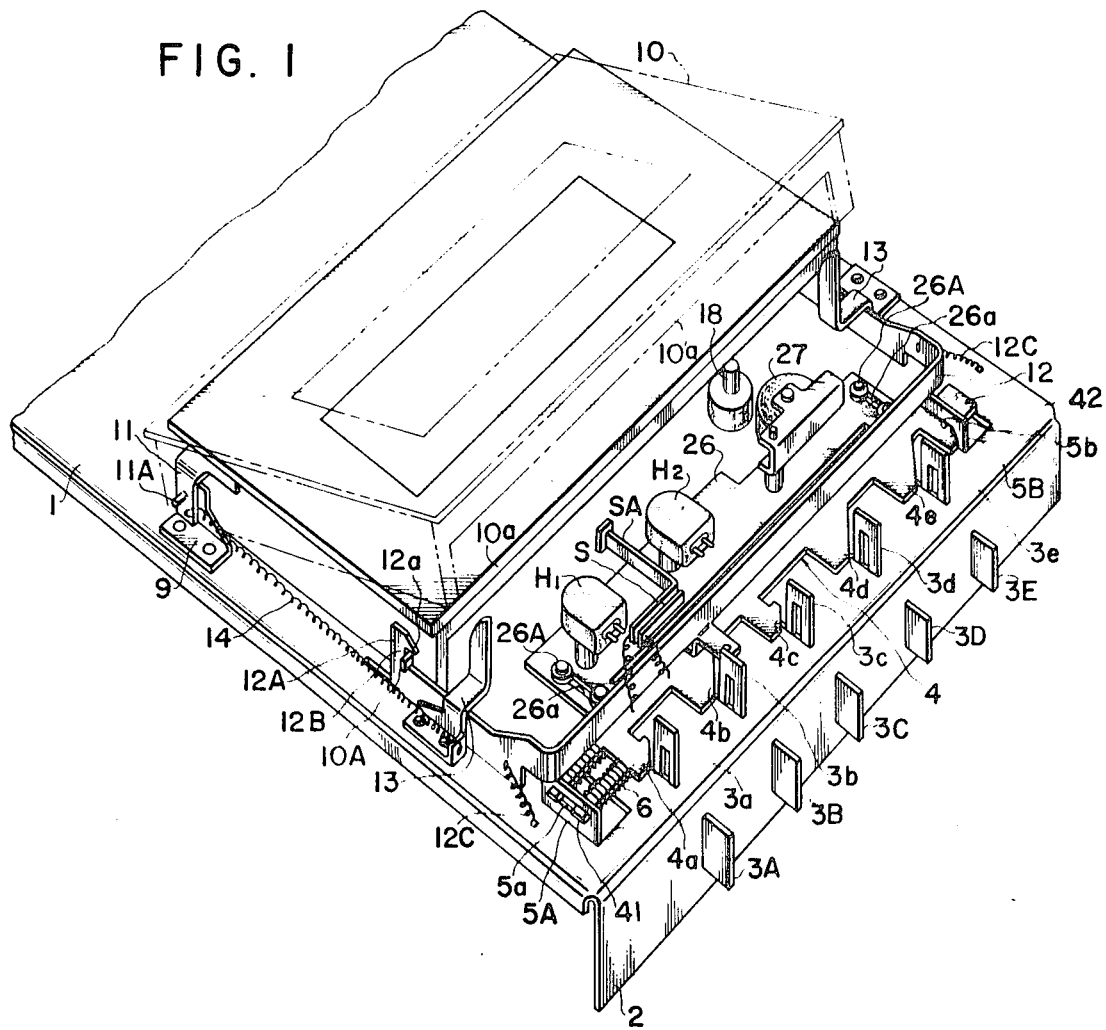
FIG. 1 is a fragmentary perspective view of a magnetic recording and playing device having an automatic cassette box erecting means which is an embodiment of the present invention.
Figure 11:
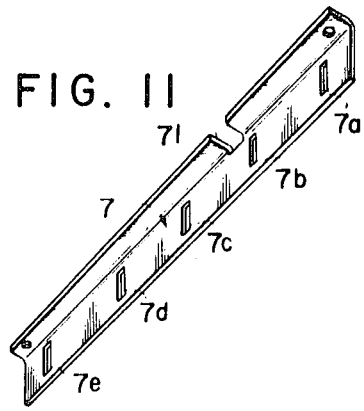
FIG. 11 is a perspective view of a pushing piece guide plate which is a component of the said device.
Figure 12:
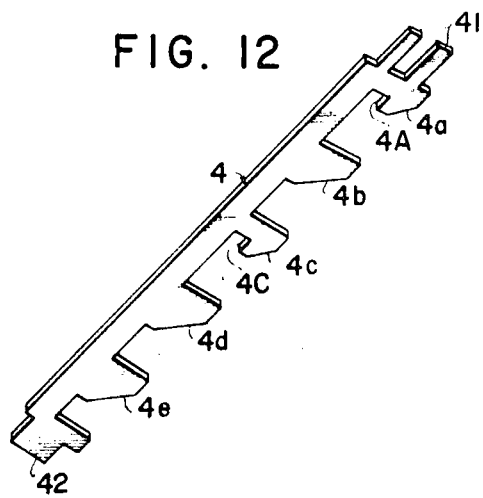
FIG. 12 is a perspective view of a slidable abutting piece which is another component of the said device.
Figure 9:
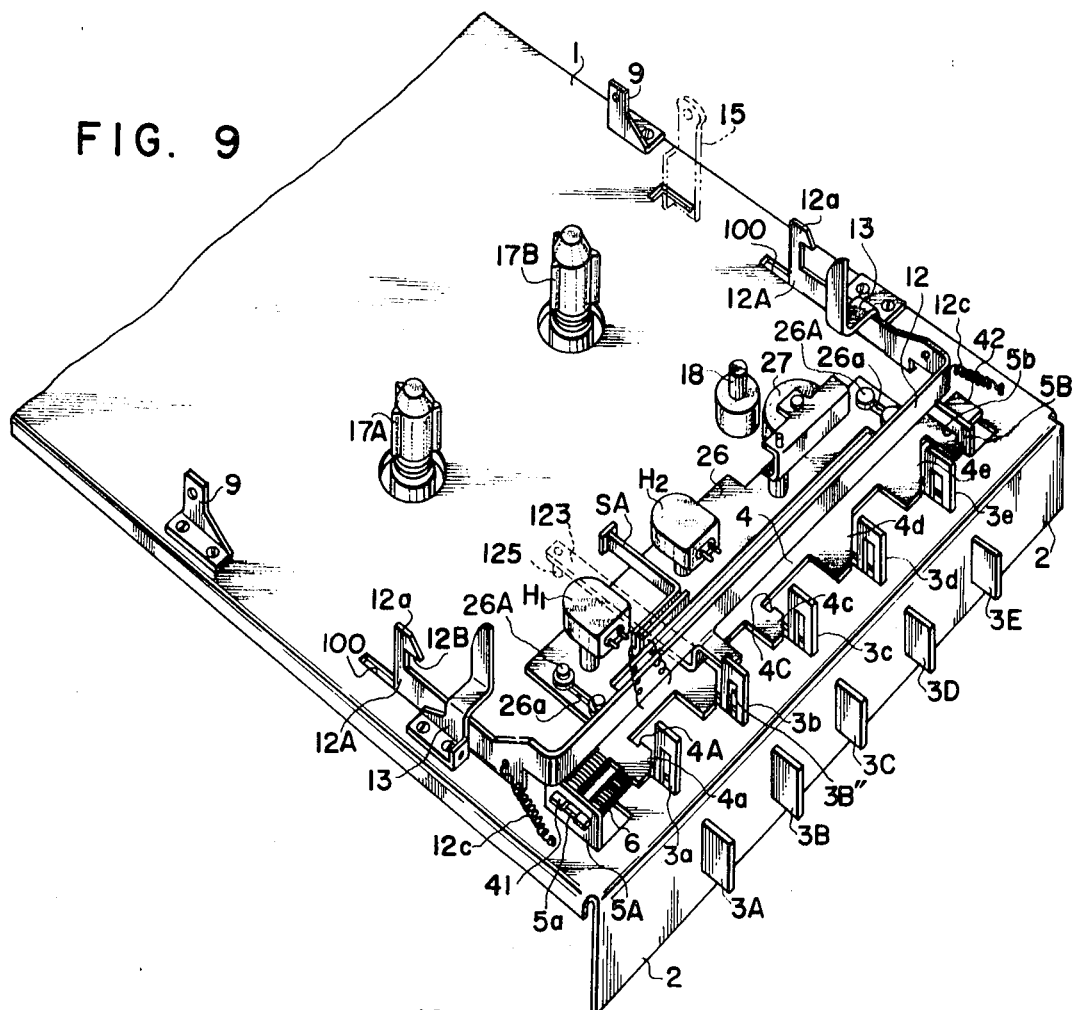
FIG. 9 is a perspective view of the device shown in FIG. 1, the device being shown with the cassette box removed.

The projection 3a, 3b, . . . 3e of each piece passes through each of the guide slots 1a, 1b, . . . 1e of the base plate 1 so as to project from the upper surface of the base plate 1. A slidable abutting piece 4 is arranged in parallel relation to the upper surface of the base 1 and has, as shown in FIG. 12, projecting sloped edges 4a, 4b, . . . 4e and hook portions 4A and 4C. The sloped edges 4a, 4b, . . . 4e are adapted to be put into abutting engagement with the rear edges 3a', 3b', . . . 3e' of the projections 3a, 3b, . . . 3e. The piece 4 further has lug portions 41 and 42 formed at the opposite ends thereof and adapted to be inserted into guide holes 5a and 5b in support projections 5A and 5B which are projectingly provided on the opposite sides of the base plate 1. Thus, as shown in FIGS. 1 and 9, the slidable abutting piece is mounted laterally movably on the upper surface of the base plate 1. The abutting piece is engaged by coil springs 6 and 6 encircling its lug portions 41 and constantly urged toward the left as seen in FIG. 1. As shown in FIG. 2, an L-shaped supporting piece 7, which in itself is shown in FIG. 11, is secured to the lower surface of the base plate 1 by means of screws and the like so as to fix downwardly. The support plate 7 has guide slots 7a, 7b, . . . 7e for loosely receiving the rear portions 3A', 3B' . . . 3E' of the pushing pieces. Each of the pushing pieces 3A, 3B, . . . 3E is mounted movably in the fore and aft directions on the base plate 1 as shown in FIGS. 1 and 2, and connected to the inner surface of the upright piece 2 by means of a tension spring 8A, 8B, . . . 8C so that, when each of the pushing pieces is released from the locking engagement, it is forwardly pulled to the initial position. These arrangements constitute a push-button type switching device PS as a whole.

Figure 3:
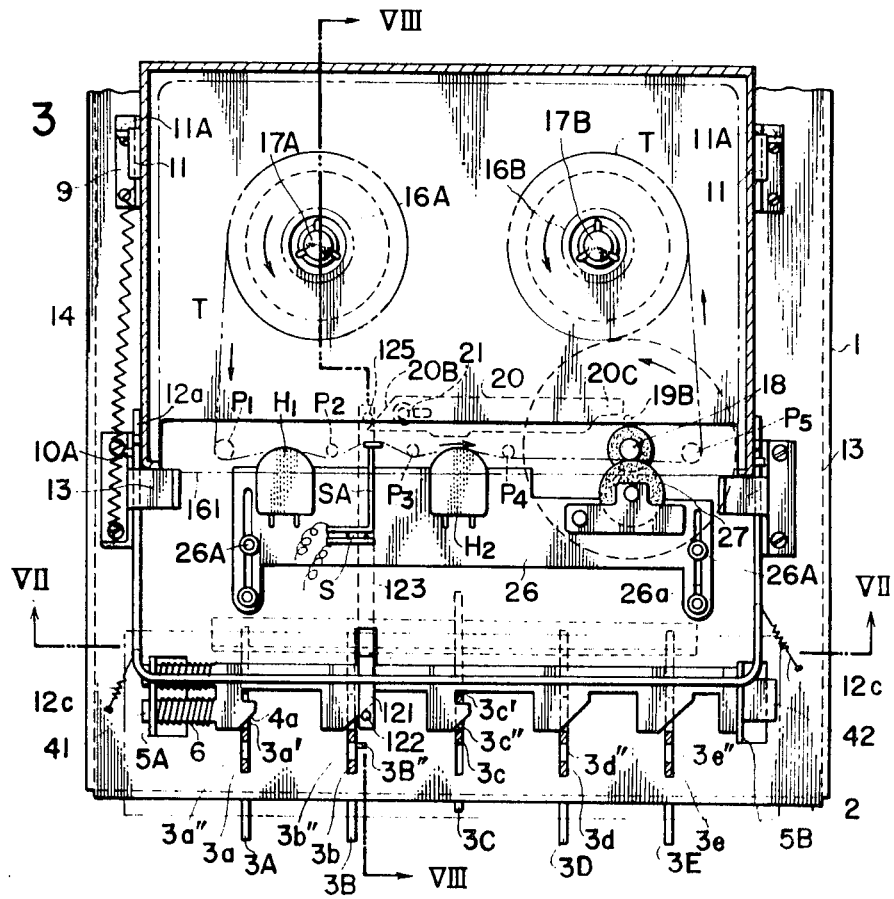
FIG. 3 is a plan view, with a part broken away, of the device shown in FIG. 1.
Figure 4:
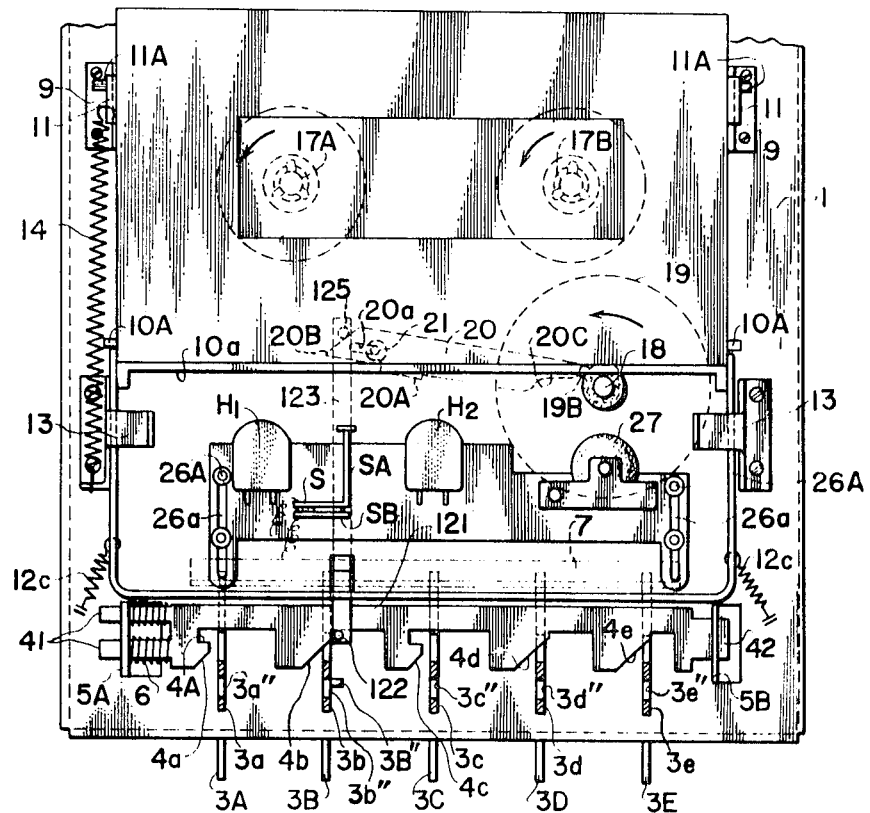
FIG. 4 is a plan view similar to FIG. 3 but showing a different position of operation.
Figure 10:
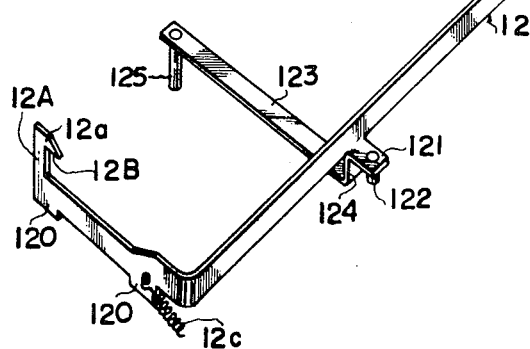
FIG. 10 is a perspective view of a locking arm which is a component of the device shown in FIG. 1.

A pair of L-shaped pivot support pieces 9 and 9 are secured to the left and right sides of the rear upper surface of the base plate 1 as shown in FIG. 9, and a flat rectangular cassette box 10 having an open forward edge is, as shown in FIG. 1, mounted on the pivot support pieces 9 and 9 erectably and pivotally with respect to the base plate 1 by means of a pair of pins 11A and 11A on pivot support pieces 11 and 11 provided at the rear opposite sides thereof. A slidable locking arm 12 of a C-shaped metal, as shown in FIG. 10, is arranged on the base plate 1 by inserting its downward projections 12 and 12 provided on both legs thereof into elongated slots 100 and 100 formed in the base plate 1. The arm 12 is guided on the upper surface of the base plate 1 by means of a pair of guide members 13 and 13 secured to the opposite sides of the base plate 1 for fore and aft movement. The arm 12 has a forwardly projecting lug 121 and a pin 122 which is downwardly projecting therefrom and adapted to be pushed by a projection 3B" on the self-returning pushing piece 3B, as shown in FIGS. 3 and 4, when the latter is depressed. One of the leg portions of the locking arm 12 is connected, by means of a tension spring 14, to the lower portion of the cassette box pivot support piece 11 so that the cassette box 10 is upwardly pivoted about the aligned pivot pins 11A and 11A under the influence of the spring 14 to the position shown by chain lines in FIGS. 1 and 2. The pivotal movement of the cassette box is limited by a stopper 15 shown in FIG. 9, so that the cassette box 10 is held in an inclined position in which its open edge is exposed above the outer housing (not shown) of the magnetic recorder and the like. Further, the locking arm 12 has at the end of each leg an upright portion 12A which includes a sloped front upper edge 12a and a recessed lower vertical edge to form a hook portion 12B. When the cassette box 10 is downwardly depressed against the action of the spring 14, the projections 10A of the cassette box 10 come into contact with the sloped edges 12a of the locking arm 12 whereby the arm is caused to move against the action of tension springs 12c and 12c disposed between the opposite sides of the arm 12 and the base plate 1 due to the sloped contour of the edges 12a. Thus, the projections 10A are brought into locking engagement with the hook portions 12B and 12B of the arm to hold the cassette box to the operative position shown by solid lines in FIGS. 1 and 8.

As shown in FIG. 9, a rewinding and feeding rotatable shaft 17A and a take-up rotatable shaft 17B are rotatably mounted on the base plate 1 at laterally spaced positions. The shafts 17A and 17B are arranged so that they respectively engage with cores 16A and 16B of a tape cassette 16 housed in the cassette box 10. On the base plate 1, there is further provided a capstan 18 at a position forwardly spaced from the shaft 17B. Below the capstan 18, there is provided a flywheel 19 in concentrical relation with the capstan as shown in FIG. 2. The flywheel has a central projection 19A and a projection 19B formed on the outer periphery of the first projection 19A. A swingable piece 20 which is shown in FIG. 14 is swingably mounted, as shown in FIG. 2, on the lower side of the base plate 1 with a predetermined spacing therefrom by means of an elongated slot 20a and so arranged that one end thereof is put into abutting engagement with the projection of the flywheel 19. The swingable piece 20 is horizontally guided by a pair of vertically spaced guide plates 22A and 22B defining a horizontal guide slot for the swingable piece and pulled rearwardly by a spring 23 disposed between the swingable piece and the guide plate 22A. A stop pin 24 for limiting the swing movement of the swingable piece 20 is provided on the lower side of the base plate 1 at a position adjacent to the flywheel. An electrical solenoid K which acts on a downwardly bent portion 20A of the swingable piece for pulling it against the action of the spring 23 is provided on the lower side of the base plate 1.

Figure 8:
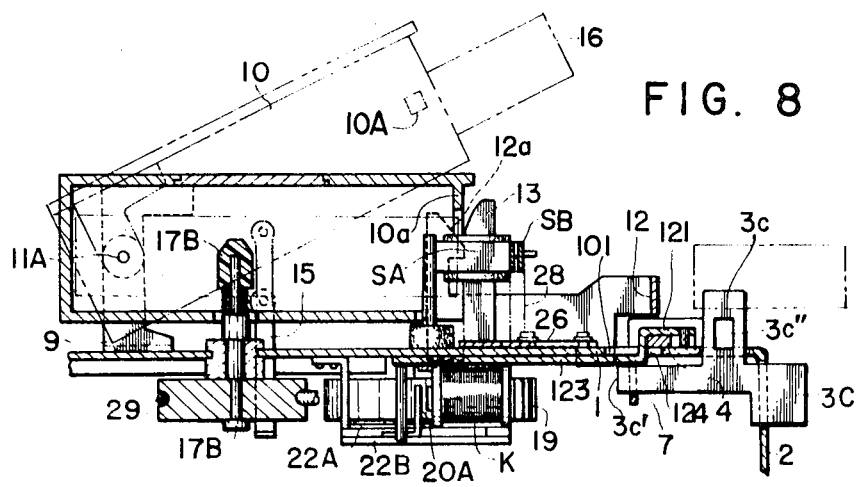
FIG. 8 is a sectional view taken along the line VIII—VIII of FIG. 3.

The slidable locking arm 12 is provided with a sliding bar 123 secured thereto at the root portion of the forward projection 121 as shown in FIG. 10. The sliding bar 123 is, as shown in FIGS. 2 and 8, slidably disposed on the base plate 1 by engaging the vertical portion 124 thereof with a slot 101 of the base plate and a cutout 71 of the support plate 7 (FIG. 11). A U-shaped guide member 25 is provided on the lower side of the base plate 1, as shown in FIG. 2, so that the sliding bar 123 is guided for longitudinal sliding movement. The sliding bar 123 is provided with a boss 125 at its rear end for engagement with a slanted edge 20B at the right end of the swingable piece 20 so as to limit the forward movement of the locking arm 12 under the influence of the tension springs 12c.

The means in accordance with the present invention as described above will be operated as follows. A magnetic tape cassette 16 having a pair of spaced cores 16A and 16B is inserted into the cassette box 10 so that the cores are respectively engaged with the rotatable shafts 17A and 17B, as shown in FIGS. 1, 3 and 9, and a magnetic tape T which is wound at the opposite ends on the cores is disposed so as to pass around guide pins $P_1$, $P_2$, . . . $P_5$ in the cassette 16. The cassette 16 is of such a type that has at its forward edge 161 a series of slots (not shown) for receiving a magnetic head $H_1$ secured on a slidable plate 26 slidably mounted on the base plate 1 by means of a pair of slots 26a and 26a and a pair of pins 26A and 26A, an actuating arm SA of a switch S for detecting the variation in tension of the magnetic tape T, a magnetic head $H_2$ for recording and playing, and a pinch roller 27 for pressing the magnetic tape T onto the capstan 18. The switch S for detecting the variation in tension of the magnetic tape T is mounted on the slidable plate 26 on the base plate 1 with the intervention of an insulating seat 28, and the actuating arm SA which is made of a conductive and resilient material such as Phosphor bronze is directed toward the tape cassette 16. A fixed contact SB for cooperation with a bent portion Sa of the arm SA is secured on the insulating seat 28.

In operation of the means made in accordance with the present invention, the cassette box 10 having a magnetic tape cassette 16 therein is pressed down on the base plate 1 as shown in FIGS. 1 and 8, and with the cassette cores 16A and 16B respectively engaged with the rotatable shafts 17A and 17B, one of the pushing pieces 3A, 3B, . . . 3E, for example the pushing piece 3C (and 3A) is pushed against the action of the return spring 8C (and 8A) whereby the slanted edge 4c (and 4a) of the hook portion of the slidable abutting piece 4 is pushed by the rear edge 3c' (and 3a') of the projection 3c (and 3a). Thus, the abutting piece 4 is leftwardly moved against the action of the coil spring C and thereafter the hook portion 4C (and 4A) is inserted into the rectangular hole 3c'' (and 3a'') provided in the projection 3c (and 3a) so as to lock the pushing piece 3C (and 3A) under the influence of the coil spring 6, as shown in FIG. 3. In this position, a separately provided switch (not shown) is closed to start a motor (also not shown). Then, actuating parts for various rotatable members of known construction, which may include motion transmitting members such as belts 29 and idlers and other control mechanisms of which details are not shown, is operated to slippingly rotate the shaft 17B, and the capstan 18 is rotated at a predetermined speed in the direction shown by the arrow. When the pushing piece 3C is rearwardly moved, the sliding plate 26 is correspondingly moved, so that the pinch roller 27 provided thereon presses the magnetic tape T onto the rotating capstan 18. Thus, the tape T is driven at a predetermined speed and taken up onto the slippingly rotating core 17B. By this means normal tape feeding can be obtained. In this instance, the magnetic heads $H_1$ and $H_2$ on the rearwardly displaced sliding plate 26 are put into contact at their slitted surfaces with the running tape as shown in FIGS. 3 and 8 so as to effect playing or recording through a separately provided playing or recording circuit. In this position the swingable piece 20 provided on the lower side of the base plate 1 is, as shown by full lines in FIGS. 2 and 5, displaced to contact with the stop pin 24 by means of the tension spring 23, so that the tapered end 20c of the piece 20 does not engage with the projection 19B of the flywheel 19 which is rotating in the direction shown by the arrow in the drawing. The switch S for detecting the variation in tension of the tape normally maintains the running tape in a rearwardly deflected position by a resilient force of the actuating arm SA, so that the arm does not contact with the fixed contact SB to keep the switch 20 open. Thus, the playing or recording operation can be continued with the swingable piece 20 positioned as shown in FIG. 2.

Figure 6:
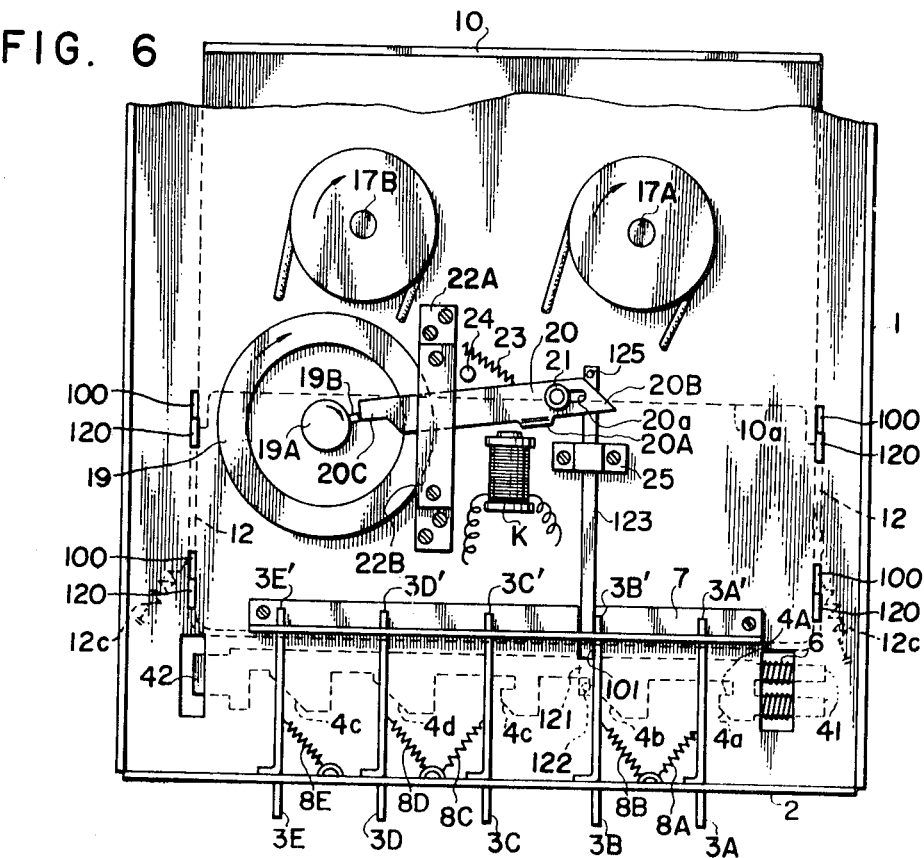
FIG. 6 is a bottom view of the device corresponding to FIG. 4.
Figure 15:
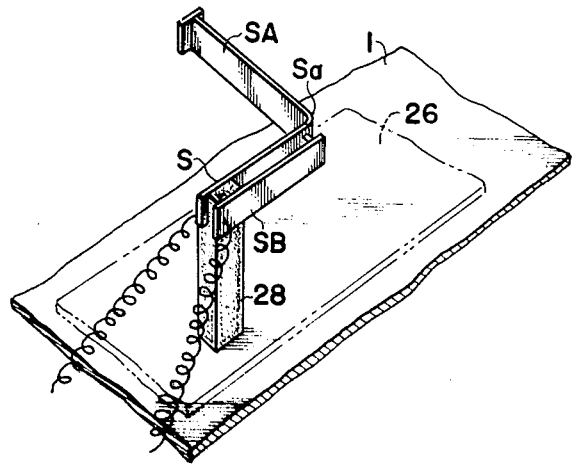
FIG. 15 is an enlarged perspective view of a switch used in the said device.

When the playing or recording operation comes to the end and the portion of the magnetic tape wound on the feeding core 16A is consumed, since the end of the tape is secured on the core 16A, the tape T is stretched between the guide pins $P_2$ and $P_3$ of the magnetic tape cassette 16 as shown by a dotted line in FIG. 3 and subjected to a substantial tension due to the driving action produced between the pinch roller 27 and the rotating capstan 18. Thus, the actuating arm SA of the switch S is actuated by the tension of the portion of the tape T between the guide pins $P_2$ and $P_3$, so that the bent portion Sa is put into contact with the fixed contact SB to close the switch S. Thus, the solenoid K provided on the lower side of the base plate 1 is energized by the electric current from a separately provided electrical source, the magnetic drawing force of the solenoid being utilized to draw the portion 20A of the swingable piece 20. Therefore, the swingable piece 20 is rotated about the boss 21 in the counterclockwise direction against the action of the tension spring 23 to the position shown by a chain line in FIG. 5. Thus, the end portion 20c of the swingable piece 20 is put into abutting engagement with the outer periphery of the projection 19A on the flywheel 19 which is rotating in the direction shown by the arrow in the drawing. Then, when the projection 19B provided on a portion of the projection 19A comes to the position in which it engages with the end portion 20c of the swingable piece 20, the latter is rightwardly driven by the substantial rotational energy of the projection 19B as shown in FIG. 6. At the same time, the boss 125 on the slidable bar 123 of the locking arm 12 is rearwardly moved together with the bar 123 by the rightward movement of the slanted edge portion 20B of the swingable piece, so that the locking arm 12 is displaced against the action of the tension springs 12c and 12c as shown in FIG. 4.

Then, due to the rearward displacement of the pin 132 provided on the projection 121 of the locking arm 12, the slanted edge 4b of the abutting piece 4 is pushed leftwardly as seen in FIG. 4, so that the abutting piece is leftwardly displaced against the action of the springs 6 and 6. When the abutting piece 4 is moved to the position shown by a chain line in FIG. 4, the hook portion 4C (and 4A) of the piece is disengaged from the hole 3'' (and 3a'') of the projection of the pushing piece 3C (and 3A) to release the piece from its locked position. Thus, the pushing piece is forwardly returned under the influence of the tension springs 8C and 8A. In this manner, all of the operational parts are returned to their initial positions to brake the rotatable shafts 17A and 17B, and stop the capstan 18 and the flywheel 19 by interrupting the current through the motor and the recording and playing circuit. When the pushing piece 3C is returned to the forward position, the sliding plate 26 is also forwardly returned, and as soon as the magnetic heads $H_1$ and $H_2$, the actuating arm SA of the tape tension detecting switch S and the pinch roller 27 are retracted forwardly from the forward edge 161 of the magnetic tape cassette 16, the locking arm 12 is rearwardly moved so that the hook portions 12B and 12B are disengaged from the projections 10A and 10A provided on the opposite sides of the cassette box 10 as shown by chain lines in FIG. 1. Thus, the cassette box 10 is, as shown by chain lines in FIGS. 1. and 8, upwardly pivoted about the pivot pins 11A and 11A under the action of the tension spring 14 until it is stopped by the stop piece 15 which serves to maintain the cassette box 10 at an inclined position. Therefore, the tape cassette 16 containing the played or recorded magnetic tape therein can be readily taken out and a new cassette can be inserted again. Thereafter, the locking arm 12 is returned to its forward position as shown in FIGS. 1 and 3 under the force of the tension springs 12c and 12c.

With the cassette box 10 projected upwardly from the housing at the inclined position, the tape cassette 16 containing a just played or recorded tape is replaced by a new one and the cassette box is pressed down against the action of the spring 14. Then, the slanted surfaces 12a and 12a of the locking arm 12 are pushed rearwardly by the projections 10A and 10A, so that the locking arm is slightly moved rearwardly against the action of the tension springs 12c and 12c to the position shown by chain lines in FIGS. 1 and 8. Thereafter, when the projections 10A and 10A come to engagement with the hook portions 12B and 12B, the locking arm 12 is forwardly returned under the influence of the tension springs 12c and 12c to the position shown by a solid line in FIG. 1 and a dotted line in FIG. 8. Thus, the cassette box 10 is placed on the base plate 1 at the predetermined position. In this position, the tape cores 16A and 16B in the newly inserted tape cassette 16 engage with the rotatable shafts 17A and 17B, so that playing or recording can be performed by simply pushing the pushing piece 3C (and 3A).

In order to effect fast forward feed (or rewinding) of the magnetic tape T, the pushing piece 3D (or 3E) is pushed against the action of the spring 8D (or 8E) with the cassette box in the pressed down position. Then, the slanted edge 4d (or 4e) of the slidable abutting piece 4 is pushed by the projected portion 3d (or 3e) of the pushing piece, whereby the slidable abutting piece is displaced leftwardly as seen in FIG. 1 against the force of the springs 6 and 6. In this instance, since the rear portion 3D' (3E') of the pushing element is in a rearwardly moved position, known mechanisms for self-restoring the rotatable elements are displaced to the fast forward feed (or rewinding) position. When the pushing piece 3D (or 3E) is released, it is returned to its forward position under the action of the return spring 8D (or 8E). At the same time, the projection 3d (or 3e) of pushing piece is disengaged from the slanted edge 4d (or 4e) of the slidable abutting piece 4 to allow the abutting piece to return to its initial position. Thus, all of the moving elements are returned to their initial positions from the fast forward feed (or rewinding) position.

In the fast forward feed (or rewinding) position, the sliding plate 26 is not moved from its forward position, so that the magnetic heads $H_1$ and $H_2$, the actuating arm SA of the switch S and the pinch roller 27 mounted on the plate 26 are not moved into the slots in the cassette 16. Therefore, they do not interfere with the fast forward feed (or rewinding) operation. Further, when it is desired to manually stop the playing (or recording) operation, the stop piece 3B is pushed. Then, the rearward movement of the projection 3b pushes the slanted edge 4b of the abutting piece 4 to move the piece leftwardly as seen in FIG. 1 against the action of the springs 6 and 6. Thus, the hook portion 4C (and 4A) of the piece 4 is released from the rectangular hole 3c" (and 3a"), so that each of the pushing pieces and the slidable plate 26 is returned to their forward position under the action of the tension spring 8C (and 8A). Thereafter, the projection 121 on the locking arm is pushed by the projection 3b''' of the pushing piece 3B so that the locking arm is displaced against the action of the springs 12c and 12c. Then, the hook portions 12B and 12B are retracted from the projections 10A, 10A of the cassette box 10. Thus, the cassette box is upwardly pivoted under the influence of the tension spring 14 in quite a similar manner as previously described in connection with automatic stopping. In this position, the tape cassette 16 housed in the cassette box can be readily replaced by a new one.

Another embodiment of the present invention will now be described with reference to FIGS. 16 through 22. In this embodiment, the locking arm 12 as shown in FIG. 10 of the first embodiment is replaced by a combination of a rotatable locking arms 220 shown in FIG. 21 and a three armed member 210 shown in FIG. 22. The other arrangement and the operation of this embodiment are identical with those of the first embodiment, so that they will not be described in detail.

Figure 16:
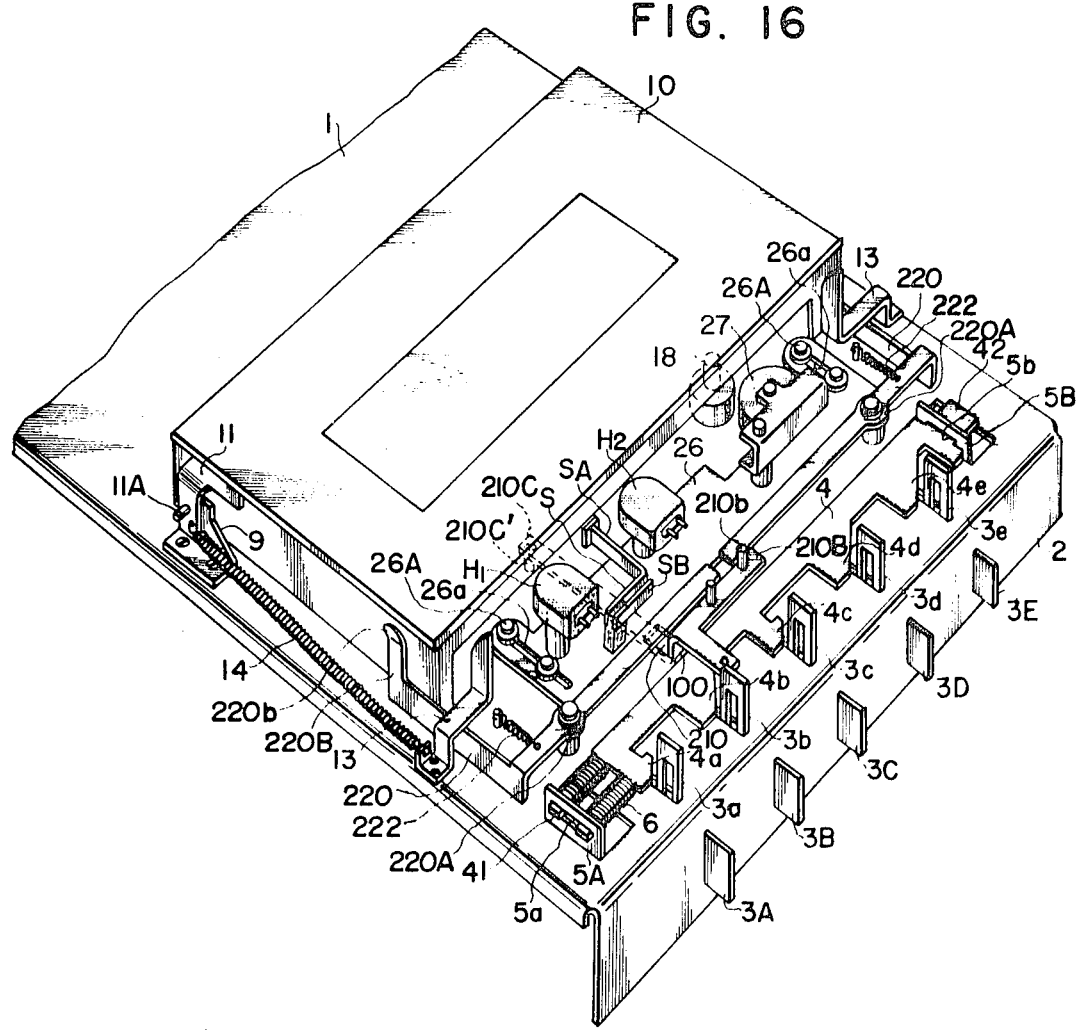
FIG. 16 is a fragmentary perspective view of a magnetic recording and playing device having an automatic cassette box erecting means which is another embodiment of the present invention.
Figure 22:
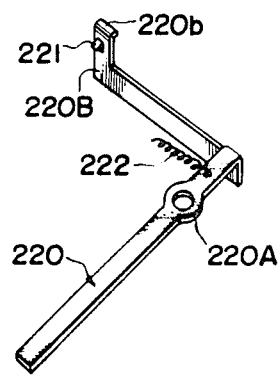
FIG. 22 is a perspective view of a slidable piece used in the said device.
Figure 20:
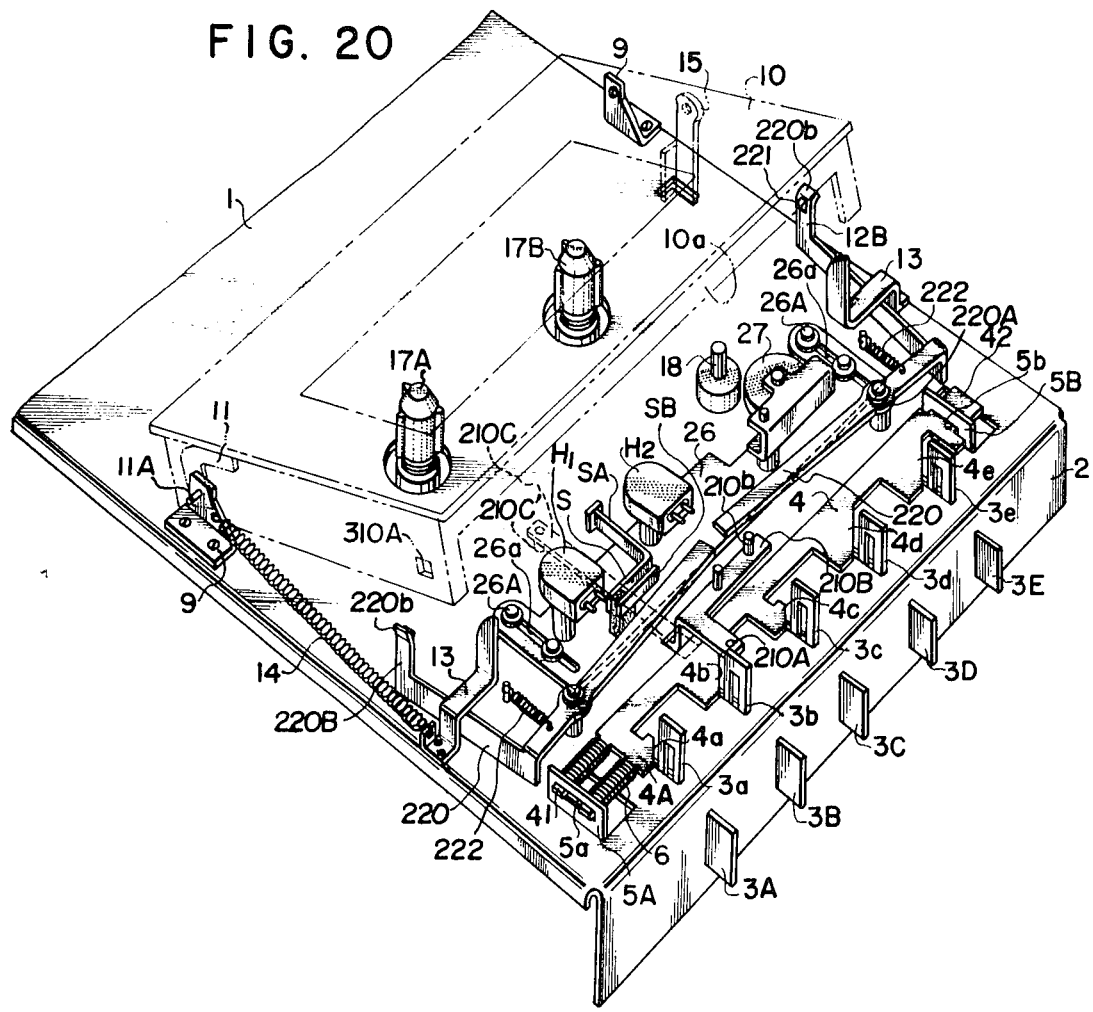
FIG. 20 is a perspective view of the device shown in FIG. 16 with the cassette box removed.

The slidable three arm member 210 comprises a forwardly directed arm 210, a transversely directed arm 210B and a rearwardly directed arm 210C which are disposed to form a substantially T-shaped member. The member 210 is further provided with a vertical portion 212 which is adapted to be loosely inserted into a rectangular slot 201 so that the arms 210A and 210B are disposed above the base plate and the arm 210C which is connected with the other two arms through the vertical portion 212 is disposed below the base plate 1 as shown in FIGS. 16 and 19. A pair of rotatable locking arms 220 and 220, each of which is formed by bending a metallic piece and the like to an L-shape, are pivotally mounted on the base plate 1 and disposed symmetrically with each other by means of their enlarged portions 220A and 220A. Each of the locking arms 220 is adapted to be rotated through engagement with a pin 210b provided on the arm 210B of the member 210 and has an upright projection 221 for engagement with a recess 310A provided on each side of the cassette box 10 as shown in FIG. 22. A tension spring 222 is disposed between a portion of each locking arm 220 adjacent to the enlarged portion 220A and the rear portion of the base plate 1. The forward rotation of each of the rotatable arms 220 is limited by a pin 210b inserted into the rectangular slot 201 in the base plate 1. Each of the rotatable locking arms 220 are guided against its vertical movement by means of a guide member 13 as shown in FIG. 20. One of the guide members 13 is connected with one end of a tension spring 14, the other end of the spring being connected to the lower portion of the pivotally supporting piece 11 of the cassette box. The spring 14 serves to upwardly pivot the cassette box 10 about a pair of aligned pivot pins 11A and 11A, the pivotal movement of the cassette box 10 is limited by a stop member 15 mounted on the base plate 1 as shown in FIG. 20. Thus, the cassette box 10 can be held in an inclined position in which the open end 10a is exposed above the housing (not shown) of the magnetic recorder and the like.

When the cassette box 10 is pressed down between a pair of rear vertical portions 220B and 220B of the rotatable locking arms 220 and 220 against the action of the springs 14 and 222, the locking projections 221 and 221 provided on the inner surfaces of the vertical portions 220B and 220B are inserted into the locking recesses 310A and 310A provided on the opposite sides of the cassette box 10 under the action of the springs 222 and 222 to lock the cassette box as shown by solid lines in FIGS. 16 and 19.

A U-shaped guide member 25 is provided on the base plate 1 in a similar manner as shown in FIG. 2 so as to guide the rearwardly directed arm 210C of the three armed member 210 against its lateral and vertical movement. The arm 210C has at its rear end a boss 210C' which is adapted to engage with the slanted edge 20B of the right end portion of the slidable piece 20, so that when the slidable piece 20 is moved to the right as viewed in the drawing, the three armed member 210 is rearwardly displaced. The forwardly directed arm 210A of the three armed member 210 has a downwardly directed boss 210a which is adapted to engage with the slanted edge 4b of the slidable abutting piece 4 when the member is rearwardly displaced.

Figure 17:
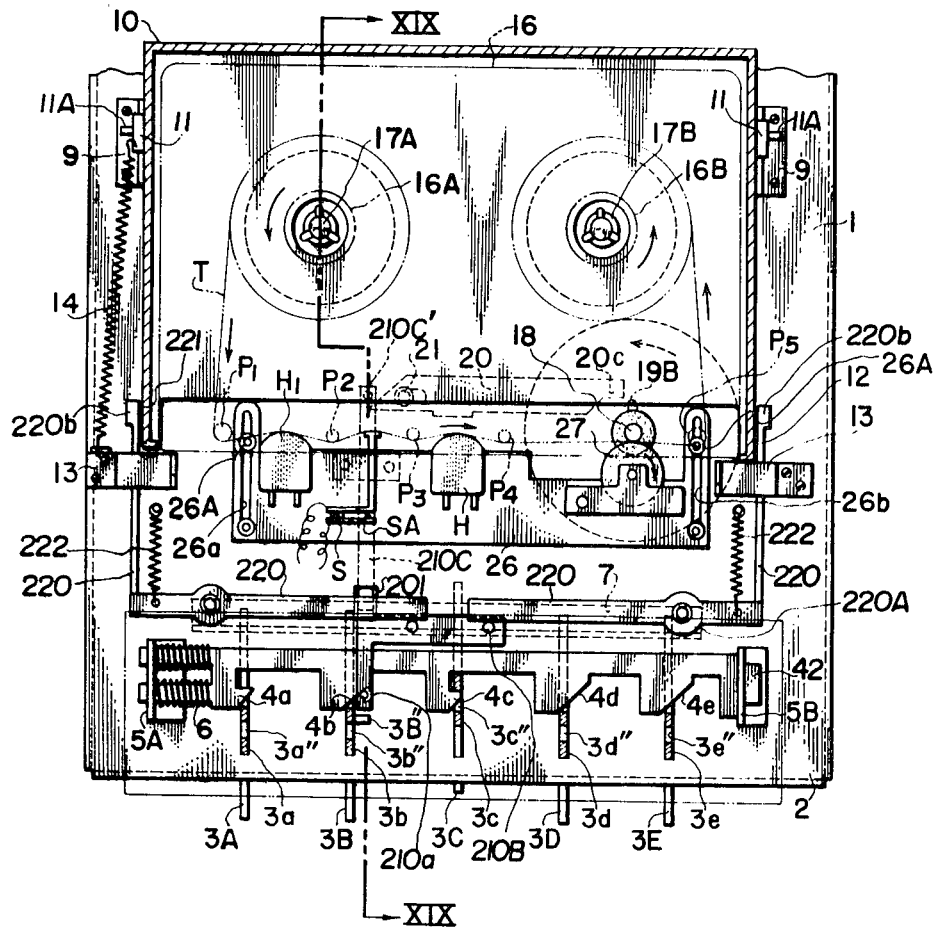
FIG. 17 is a plan view, with a part broken away, of the said device.
Figure 21:
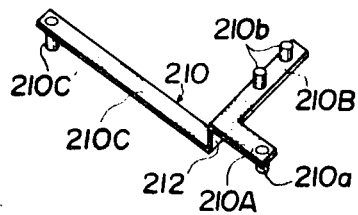
FIG. 21 is a perspective view of a rotatable locking arm used in the embodiment of FIG. 16.

The embodiment constructed as described above can be operated in a similar manner as in the previously described embodiment. The three armed member 210 corresponds to the slidable member 123 except that the former is provided with pin portions 210b and 210b. Therefore, the operation of the pin portions only will now be described. When the three armed member 210 is rearwardly displaced, the transverse arm 210B rotatably drives the rotatable locking arms 220 and 220 by means of the pins 210b and 210b against the action of the tension springs 222 and 222 from the position shown in FIG. 17 to the position shown in FIG. 18. Thus, the projections 221 and 221 of the locking arms are retracted from the locking recesses 310A and 310A formed in the opposite sides of the cassette box 10 to allow the cassette box to upwardly pivot about the aligned pivot pins 11A and 11A under the action of the tension spring 14 as shown by chain lines in FIGS. 19 and 20 until it engages with the stop piece 15 which holds the cassette box 10 in an inclined position. Thus, the forward edge portion 10a of the cassette is exposed above the outer housing so that the magnetic tape cassette 14 containing an already played or recorded tape can be readily replaced by a new one. Just after the cassette box is upwardly pivoted, the three armed member 210 is returned to the initial position as shown in FIGS. 16 and 17 under the action of the tension springs 222 and 222 together with the rotatable locking arms 220 and 220.

When the tape cassette 16 housed in the upwardly pivoted cassette box 10 is replaced by a new one, the cassette box is pressed down against the action of the spring 14 and inserted between the vertical portions 220B and 220B of the rotatable locking arms through the curved portions 220b and 220b at the upper ends thereof. Then, the rotatable arms 220 and 220 are slightly outwardly pivoted about their enlarged portions 220A and 220A against the action of the tension springs 222 and 222, and thereafter the projections 221 and 221 of the rotatable locking arms 220 and 220 engage with the locking recesses 310A and 310A provided on the opposite sides of the cassette box 10. Thus, the rotatable locking arms 220 and 220 are returned to the positions shown in FIGS. 16 and 17 by the springs 222 and 222 to lock the cassette box 1 in the predetermined position on the base plate 1. In this position, he cores 16A and 16B of the tape cassette which is housed in the cassette box engage with the rotatable shafts 17A and 17B so as to be ready for playing or recording.

Further, since the three armed member is rearwardly moved against the action of the tension springs 222 and 222 together wtih the rotatable locking arms 220 and 220 by being pushed at the forwardly directed arm 210A by the projection 3b''' of the pushing piece 3B, the projections 221 and 221 can be retracted from the locking recesses 310A and 310A of the cassette box so as to allow the cassette box to upwardly pivot under the action of the spring 14 in order to facilitate the replacement of the tape cassette 16.

As described above, according to the present invention, a cassette box 10 for receiving a cassette 16 including a magnetic tape T and the like is pivotally mounted on the base plate 1 so that the forward opened end 10a is exposed above the housing by means of a resilient device such as a spring 14 and the like. The cassette box 10 can be pressed down against the action of the spring 14 so that it is placed in the plane of the base plate, and locked in place by engaging the locking projections or recesses 10A with the hook portions 12B and 12B of the slidable locking arm 12 provided in relation with the abutting piece 4 of the switching device PS or with the projections 221 and 221 of the rotatable locking arm 220. Thereupon, the cores 16A and 16B are engaged with the rotatable shafts 17A and 17B so as to allow normal tape feed, fast forward feed or rewinding operation. Further when the running tape is almost completely fed and the end of the tape is reached, the electrical solenoid K is instantaneously energized through the switch S so as to rotate, by its magnetic force, the swingable piece 20 for returning the switching device PS and the locking arm 12 to their initial positions, whereby the end 20c of the swingable piece 20 is placed near the projection 19B on a rotatable body such as a flywheel 19 which has a substantial rotational inertia, the projection 19B serving to drive the swingable piece 20 by the rotational energy thereof to return the switching device PS to the initial position to stop it and thereafter slide or rotate the locking arm to retract the engageable portion of the arm from the corresponding portion of the cassette box. Thus, the forward portion of the cassette box can be automatically projected upwardly to an inclined position by the resilient force of the spring 14 so as to facilitate the replacement of the cassette 16. Further, the fact that the magnetic tape T came near to its end can be detected by a switch S which senses the tension of the tape T to rotate the swingable piece 20 through an electrical solenoid K whereupon the swingable piece 20 is displaced by a large rotational force of a rotatable body such as a flywheel 19 and the like which has a substantial rotational inertia, so that a large power switching device PS and the locking arm 12 or 220 can readily be displaced or rotated. Therefore, according to the present invention, in contrast to a known means in which a switch for detecting the end of a strap-like carrier serves to energize a relay or a transistor circuit to actuate a plunger for directly actuating locking members by a large magnetic force, only a light swingable piece 20 is rotated by a relatively weak magnetic force of the electrical solenoid K, and the switching device PS and the locking arm 12 or 220 for the cassette box 10 are displaced by the rotational force of the rotatable body such as a flywheel 19 of substantial inertia so as to automatically stop the magnetic recorder and expose the open end 10a of the cassette box 10 above the outer housing. Thus, the electrical power consumption of the solenoid K can be remarkably reduced. Further, since the electric current of the solenoid K can be directly controlled by the switch S itself, it is not necessary to provide a relay or a transistor circuit. Thus, the present invention is advantageous in that the apparatus can be made very simple and inexpensive. The present invention can be very well applied as an automatic erecting means for a cassette box of a magazine type recorder.

Further, although the embodiments of the present invention as illustrated and described are concerned with the horizontal type magnetic recorder, the invention can also be applied to a vertical type recorder. It should be understood that the present invention can also be embodied as an automatic erecting means for a film cassette in a photographic camera or a movie projector. The tape and detector switch S should not necessarily be limited to the illustrated type. For example, any known switch that may be closed by a conductive portion, a transparent portion or a slot provided at the end portion of the magnetic tape T. Further, as switching device PS, any known mechanism other than the illustrated push-button type, such as a rotary type, may be used.

I claim:

1. Automatic means for erecting a tape player cassette box housing a magnetic tape cassette or the like from an operating position to a loading position comprising:
   support means movably mounting said cassette box for movement between said operating position and said loading position,
   means biasing said cassette box toward said loading position,
   latch means for releasably engaging said cassette box and holding said cassette box in said operating position,
   latch release means operatively interconnected with said latch means for selectively releasing said latch means, said latch release means being selectively operatively engageable with a rotating body having rotational inertia sufficient to release said latch, whereby when said latch release means engages said rotating body said latch release means is driven thereby to release said latch, and
   means selectively engaging said latch release means with said rotating body.

2. Apparatus as defined in claim 1 wherein said tape player includes a drive motor having a flywheel and wherein said rotating body is said flywheel.

3. Apparatus as defined in claim 2 wherein said latch release means comprises a movable arm selectively engageable with said flywheel and means for moving said arm into engagement with said flywheel.

4. Apparatus as defined in claim 3 wherein said means selectively engaging said latch release means with said rotating body comprises an electro-magnet operatively interconnected with said arm for moving said arm into engagement with said flywheel when said electro-magnet is temporarily energized and means for energizing said electro-magnet in response to a predetermined condition of said tape.

5. Apparatus as defined in claim 4 wherein said predetermined condition is the end of the tape.

6. Apparatus as defined in claim 4 wherein said latch means comprises a first part carried by said cassette box and a second part carried by said base and movable with respect to said first part between a latched position and a released position whereby said cassette box can be erected, said movable arm engaging said second part to move said second part to said released position when said movable arm is motivated by engagement with said flywheel.

7. Apparatus as defined in claim 5 wherein said flywheel includes a projection for engaging said movable arm.

8. Apparatus as defined in claim 6 further comprising switch means carried by said second part of said latch, said switch means activating components of said tape player when said second part engages said first part.

(References on following page)

References Cited

UNITED STATES PATENTS

| | | | |
|---|---|---|---|
| 3,385,534 | 5/1968 | Staar | 274—4 E |
| 3,417,938 | 12/1968 | Markakis | 179—100.2 Z |
| 3,439,919 | 4/1969 | Laa | 274—4 E |
| 3,458,158 | 7/1969 | Ohira | 274—4 E |
| 3,476,392 | 11/1969 | Culbertson | 274—4 E |

FOREIGN PATENTS

| | | | |
|---|---|---|---|
| 1,233,160 | 1/1967 | Germany | 274—4 E |

JOHN F. CAMPBELL, Primary Examiner

D. P. ROONEY, Assistant Examiner

U.S. Cl. X.R.

206—59, 62; 274—4 C, 4 E; 179—100.2 Z